United States Patent Office 3,186,857
Patented June 1, 1965

3,186,857
METHOD FOR DECREASING ADHESION OF SILICATE ADHESIVES TO HEATED METAL SURFACES
Helmut V. Freyhold, Dusseldorf-Oberkassel, and Arno Spange, Dusseldorf-Benrath, Germany, assignors to Philadelphia Quartz Company, Philadelphia, Pa., a corporation of Pennsylvania
No Drawing. Filed Feb. 23, 1962, Ser. No. 175,345
Claims priority, application Germany, Mar. 30, 1961, H 42,166
7 Claims. (Cl. 106—82)

INTRODUCTION

This invention generally relates to a method for decreasing the adhesion of silicate adhesives to heated metallic surfaces as well as compositions useful in conjunction with the method. More particularly, this invention involves incorporating certain carboxylic acids or their alkali metal salts into silicate adhesives so as to decrease the metal adhering properties of the silicate adhesive.

THE PROBLEM

In the production of a laminated paperboard the adhesive is first applied to the surface of one sheet and then a second sheet is pressed over the adhesive layer and held in the laminated position until the adhesive has set, primarily by loss of moisture. In the manufacture of corrugated paperboard for example, the adhesive is applied to the tips of the corrugations and a liner sheet is applied in position in contact with the flute tips of the corrugation. The adhesive is then dried by passing the web over heated metal plates called platens in the case of the double-backer or a heated roll in the case of the single-face liner. In the practice of this process the laminated sheets may become misaligned and the adhesive on the flute tips at the edge of the web may be scraped off onto the hot metal surfaces. Also, if too heavy a glue spread is applied some may ooze from the edge of the combined sheet and drip onto the hot platen. The adhesive may also come into contact with the hot metal surfaces if a liner sheet breaks and the unprotected flute tips come into direct contact with the platen.

Soluble silicates readily attach themselves to metal surfaces. They are polar adhesives and form a strong bond with the metal when dried out. Furthermore, the dry silicate adhesive itself is strong and hard and glassy. Ridges and rough spots formed by the dried adhesive will scratch the outer surfaces of the laminated boards in passing over them. It is therefore necessary for the operator to remove the hard drippings and accumulation first by chipping them off by hand and then by scraping and polishing the metal surface to restore it to its original smooth condition. This cleaning operation is slow and tedious and must be undertaken 2 or 3 times a day in some cases depending on the ability of the operator to schedule board of increasingly narrow width and to avoid accidents to the paper liner. Silicate adhesives nevertheless continue to be used by the corrugating industry particularly where board having extra strength and rigidity is desired. Oil coatings on metal rollers and graphite coatings on metal aprons to reduce scraping have been of some assistance.

A solution to the silicate clean-up problem has been sought for over twenty years. Generally, two approaches have been taken. One is to provide a protective coating for the metal surfaces which may become smeared with silicate. However, a satisfactory coating must not only be silicate-resistant but must withstand temperatures up to 400° F. as well as vigorous wear of the paper sheet passing over it continuously. The second approach is to modify the adhesive itself with additives. However, a satisfactory additive must not only be an effective parting agent toward metal, but must be compatible with the silicate adhesive, add little to its cost or odor and not interfere with its intended purpose of gluing paper. Consideration has also been given to changing the metal of which the corrugating equipment is constructed but even if a satisfactory solution were found in this way, it would be difficult to have it accepted by the manufacturers of such equipment.

A number of prior art patents have dealt with this problem, as for instance, 2,347,419; 2,671,747; 2,736,678; 2,772,177; 2,778,285, and 2,834,744.

OBJECTS

The main object of the present invention is to provide a composition and method for decreasing the adhesion of an adhesive silicate composition to heated metal surfaces generally. These and other objects will occur to those skilled in the art from the description of the invention set forth below.

THE INVENTION BROADLY

We have discovered that by incorporating small amounts of certain straight chain aliphatic carboxylic acids or their alkali salts into silicate adhesives it is possible to achieve surprising improvements in preventing the adhesion of the silicate adhesive to hot metal surfaces.

THE CARBONIC ACIDS

The straight-chain aliphatic carboxylic acids useful in accordance with this invention have between 8 and 10 carbon atoms (such as caprylic and capric acids). The carboxylic acids or their alkali metal salts are added in amounts up to 5 percent by weight, and preferably in an amount within the range of 0.5 to 2 percent by weight of the adhesive. Amounts greater than 5 percent can be used but there is no particular advantage in such increased amounts. They may be added to the other components of the adhesive directly or in solution or in suspension, and mixed thoroughly with the silicate adhesive.

THE SILICATE ADHESIVE

We have found that nearly any well-known or commercial sodium silicate type adhesive can be benefitted in accordance with the present invention. As is well known, aqueous sodium silicate alone forms a highly satisfactory adhesive material. It is therefore contemplated that simple combinations of aqueous sodium silicate and the aforementioned straight chain aliphatic carboxylic acids (or their alkali salts) will form an excellent adhesive in accordance with this invention.

Commercial silicates which are suitable for the purpose of this invention include those in which the mol ratio of $Na_2O$ to $SiO_2$ is between 1:2 and 1:4. These silicates may have a 20 to 45 percent solids content, corresponding to approximately 28–48° Bé.

A considerable number of "additive" compounds known in the prior art may be combined with the aqueous sodium silicate and carboxylic acids in order to produce a useful modified silicate adhesive. Examples of such additive materials would include for example starch, clay, diatomaceous earth, bentonite, kaolin, etc. and these additives may be present in an amount between about 5 and 20 percent by weight. Specific examples of such modified silicate adhesives can be found in Patents 2,239,358; 2,554,035; 2,669,282; 2,772,996 and 2,681,290.

The additives may be added to the silicate adhesive mixture either directly or in solution or in suspension, and mixed thoroughly with the silicate adhesive.

OTHER ADDITIVES

The adhesion of the silicate adhesives in accordance with this invention may be further decreased in many instances by the addition of small amounts of potassium or sodium chromate, preferably between about 0.1 and 0.2 percent by weight with respect to the total composition and/or of between about 0.5 and 2.0 percent by weight of urea. We were surprised to find that a synergistic effect was achieved with these additives, since these additive materials in a silicate adhesive which did not contain any of the aforesaid carboxylic acids only had a very insignificant effect.

The technical quality of the adhesive when employed on cellulose-containing materials is not damaged by the additive materials of the present invention. Furthermore, the viscosity remains practically unchanged.

ADVANTAGES AND UNEXPECTEDNESS

According to the method of this invention it is possible to reduce the metal adhering properties of the adhesive to a considerable degree. This reduction is noticeable even when the adhesive contains considerable amounts of fillers. To a certain extent however the reduction partially depends upon the viscosity and the $SiO_2$ portion of the alkali silicate employed.

The effect of the application of the chosen aliphatic carboxylic acids or their alkali metal salts is most surprising because practically no useful effect is obtained with similar mixtures, such as for example aliphatic carboxylic acids having less than 6 or more than 10 carbon atoms, or branched-chained carboxylic acids, such as for example 2-ethylcaproic acids.

THE EXAMPLES

The following examples are illustrative of preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric, unless otherwise stated.

The tenacity of adhesion of an adhesive on metal can be determined in several different ways. The test method which is the source of the values given in the following examples has been found to be effective and can be briefly summarized.

In this adhesion test method a synthetic resin ring (radius of opening 1.5 cm.) is placed on a metal plate and then supplied (in the center of the ring) with 1 ccm. of the silicate adhesive. When the plate is heated to 130° C. the adhesive dries out or "sets" and the resin ring is then removed.

A steel blade is then applied diagonally upon the flat metal plate at a pressure of 5 kg. The steel blade is moved in horizontal direction on the metal plate, by means of a screw thread, along toward the adhering "set" adhesive. Guides are provided to prevent the blade from deviating from its course. Between the steel blade and the screw thread is a spring weight from which may be determined the force necessary to remove substantially all the dried adhesive mass from the metal surface.

The spring weight indicates the degree of the adhesive strength in kg. The adhesion is from 2.1 to 2.4 kg. when using the commercial waterglasses. Generally several readings are taken. All of the figures presented therefore indicate average values:

Example 1

1 kg. of waterglass (mol ratio $Na_2O:SiO_2$ of 1:3.35 and a 37/40° Bé.) was mixed with 5 g. of caprylic acid suspended in 20 g. of water, with stirring. The adhesion of such a water-glass solution on metal surfaces, when measured according to the above-described test method, measured approximately 1.4 kg.

Similar results were achieved when capric acid was used in place of the caprylic acid.

However, when caproic acid or 2-ethylcaproic acid was used instead of the caprylic acid, there was practically no change in the metal adhesion properties as compared with the same silicate adhesive without additive (adhesion strength approximately 2.3 kg.). Also it was found that the removal was more complete when employing the additive materials of the present invention.

Example 2

When 2 g. of potassium chromate were added to the caprylic acid mixture described in Example 1, then the resistance to removal became even less and was on the average 1.05 kg. This result was not impaired even when using a waterglass containing filler material of approximately 100 g. of siliceous earth.

Example 3

To the waterglass adhesive described in Example 1, containing caprylic acid, there was added 20 g. of urea. The strength of this adhesive using the same text procedure as described above was only 0.95 kg.

Example 4

To a silicate adhesive adapted for use in the machine adhesion of paperboard, consisting of 50 kg. of waterglass (mol ratio $Na_2O:SiO_2$ of 1:3.32 and a 40/42° Bé.) was added 0.25 kg. of caprylic acid in the form of the sodium salt, dissolved in a small amount of water. The removal-resistance of the resulting adhesive, measured according to the above-described test method, was about 0.9 kg. as opposed to 2.1 kg. when no caprylic acid was present.

CONCLUSION

More or less specific claims will be presented hereinafter and even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art and still other obvious equivalents could be readily ascertained upon rather simple, routine, non-inventive experimentation. Certainly no invention would be involved in substituting one or more of such obvious equivalents (e.g., potassium silicate in place of sodium silicate) for the materials specifically recited in the claims. We intend that all such obvious equivalents be encompassed within the scope of this invention and patent grant in accordance with the well-known doctrine of equivalents, as well as changed proportions of the ingredients which do not render the composition unsuitable for the disclosed purposes.

The term "consisting essentially of," as used in the following claims, is meant to include compositions containing the named ingredients in the proportions stated and any other ingredients which do not destroy the usefulness of the compositions for the purposes stated in the specification.

What is claimed is:

1. An adhesive composition having a low adherence to metal consisting essentially of aqueous sodium silicate having a mol ratio of $Na_2O$ to $SiO_2$ of between about 1:2 and 1:4 and between about 0.5% and 5% by weight of a compound selected from the group consisting of caprylic acid, capric acid and the alkali metal salts of caprylic and capric acids.

2. An adhesive composition according to claim 1 which additionally contains between about 0.1 and 0.2% by weight of potassium chromate.

3. An adhesive composition according to claim 1 which additionally contains between about 0.1 and 0.2% by weight of sodium chromate.

4. An adhesive composition according to claim 1 which additionally contains between about 0.5 and 2.0% by weight of urea.

5. An adhesive composition having a low adherence to metal consisting essentially of aqueous sodium silicate having a mol ratio of $Na_2O$ to $SiO_2$ of between 1:2 and 1:4 and between about 0.5% and 5% by weight of caprylic acid.

6. An adhesive composition having a low adherence to metal consisting essentially of aqueous sodium silicate having a mol ratio of $Na_2O$ to $SiO_2$ of between 1:2 and 1:4 and between 0.5% and 5% by weight of capric acid.

7. The method of decreasing the metal adhering tendencies of sodium silicate base adhesives which consists essentially in adding to the silicate base adhesive having a mol ratio of $Na_2O$ to $SiO_2$ of between 1:2 and 1:4 between about 0.5% and 5% by weight of a compound selected from the group consisting of straight chain aliphatic carboxylic acids having 8–10 carbon atoms and the alkali salts of such acids.

References Cited by the Examiner
UNITED STATES PATENTS

| | | | |
|---|---|---|---|
| 2,842,448 | 7/58 | Dereich | 106—82 |
| 2,870,033 | 1/59 | Lander | 106—82 |

TOBIAS E. LEVOW, *Primary Examiner.*
JOSEPH REBOLD, *Examiner.*

UNITED STATES PATENT OFFICE
CERTIFICATE OF CORRECTION

Patent No. 3,186,857      June 1, 1965

Helmut V. Freyhold et al.

It is hereby certified that error appears in the above numbered patent requiring correction and that the said Letters Patent should read as corrected below.

Column 5, line 8, before "0.5%" insert -- about --.

Signed and sealed this 30th day of November 1965.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,186,857                                June 1, 1965

Helmut V. Freyhold et al.

It is hereby certified that error appears in the above numbered patent requiring correction and that the said Letters Patent should read as corrected below.

Column 5, line 8, before "0.5%" insert -- about --.

Signed and sealed this 30th day of November 1965.

(SEAL)
Attest:

ERNEST W. SWIDER                                EDWARD J. BRENNER
Attesting Officer                               Commissioner of Patents